(12) United States Patent
Lai

(10) Patent No.: US 8,262,220 B2
(45) Date of Patent: *Sep. 11, 2012

(54) METHOD OF MAKING HIGH PRECISION OPTICS HAVING A WAVEFRONT PROFILE

(76) Inventor: Shui T. Lai, Encinitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/118,576

(22) Filed: May 31, 2011

(65) Prior Publication Data

US 2012/0050669 A1 Mar. 1, 2012

Related U.S. Application Data

(63) Continuation of application No. 11/782,912, filed on Jul. 25, 2007, now Pat. No. 7,959,284.

(60) Provisional application No. 60/820,340, filed on Jul. 25, 2006, provisional application No. 60/820,483, filed on Jul. 26, 2006.

(51) Int. Cl.
G02C 7/02 (2006.01)
G02C 7/16 (2006.01)
G02B 3/00 (2006.01)

(52) U.S. Cl. ............... 351/159.01; 351/159.57; 359/642

(58) Field of Classification Search .................. 351/159, 351/159.01, 159.02, 159.33, 159.41, 159.57, 351/159.73; 359/642, 637, 16
See application file for complete search history.

(56) References Cited

U.S. PATENT DOCUMENTS

| | | | |
|---|---|---|---|
| 5,332,802 A | 7/1994 | Kelman et al. | |
| 5,895,422 A * | 4/1999 | Hauber | 623/6.31 |
| 5,993,438 A | 11/1999 | Juhasz | |
| 6,280,470 B1 | 8/2001 | Peyman | |
| 6,676,653 B2 | 1/2004 | Juhasz et al. | |
| 6,989,008 B2 | 1/2006 | Peyman | |
| 7,286,295 B1 * | 10/2007 | Sweatt et al. | 359/619 |
| 7,959,284 B2 * | 6/2011 | Lai | 351/177 |
| 2005/0182488 A1 | 8/2005 | Peyman | |
| 2005/0259221 A1 * | 11/2005 | Marmo | 351/160 R |
| 2006/0017990 A1 * | 1/2006 | Platt et al. | 359/16 |

(Continued)

FOREIGN PATENT DOCUMENTS

WO 2005/116729 A2 12/2005

(Continued)

OTHER PUBLICATIONS

Communication regarding the transmission of the European search report, European search opinion, and Supplementary European search report, for 07813349.3, filed Jul. 25, 2007 (EP2049924), dated Dec. 17, 2010, 7 Pages.

PCT International Preliminary Report on Patentability Chapter I (IB/373) for PCT Application No. PCT/US2007/074335, report dated Jan. 27, 2009, 8 pages.

PCT Written Opinion of the International Search Authority for PCT Application No. PCT/US2007/074335, report dated Mar. 26, 2008, 7 pages.

(Continued)

*Primary Examiner* — Jordan Schwartz
(74) *Attorney, Agent, or Firm* — SF Bay Area Patents, LLC; Andrew V. Smith

(57) ABSTRACT

A method of generating a high precision optical surface profile includes obtaining a high precision optical surface profile which contains information of the optical path difference map of the profile. A substrate material has a known index of refraction, Ns, while a cover material has an index Nc that is more closely matched to the index Ns of the substrate material than the index of air Nair to Ns. An exaggerated surface profile is cut that is proportionally expanded from the high precision profile by a factor: (Ns−Nair) divided by (Ns−Nc). The cut surface profile is covered with the cover material.

31 Claims, 2 Drawing Sheets

Optical Window (480)
Cover Material (360)
Substrate Material (240)

U.S. PATENT DOCUMENTS

| | | |
|---|---|---|
| 2006/0052547 A1 | 3/2006 | Jethmalani et al. |
| 2007/0074335 A1 | 4/2007 | Gafforio et al. |
| 2007/0074522 A1 | 4/2007 | Kim et al. |
| 2008/0037135 A1 | 2/2008 | Lai |
| 2008/0039825 A1 | 2/2008 | Lai |

FOREIGN PATENT DOCUMENTS

| | | |
|---|---|---|
| WO | 2006/015490 A1 | 2/2006 |
| WO | 2006/023404 A2 | 3/2006 |
| WO | 2008/014330 A2 | 1/2008 |
| WO | 2008/014419 A2 | 1/2008 |
| WO | 2008/014330 A3 | 6/2008 |
| WO | 2008/014419 A3 | 11/2008 |

OTHER PUBLICATIONS

PCT International Preliminary Report on Patentability Chapter I (IB/373) for PCT Application No. PCT/US2007/074522, report dated Jan. 27, 2009, 4 pages.

PCT Written Opinion of the International Search Authority for PCT Application No. PCT/US2007/074522, report dated Sep. 2, 2008, 3 pages.

Communication regarding the transmission of the European search report, European search opinion, and Supplementary European search report, for 07840542.0, filed Jul. 26, 2007 (EP2056755), dated Jun. 9, 2011, 3 Pages.

* cited by examiner

METHOD OF MAKING HIGH PRECISION OPTICS HAVING A WAVEFRONT PROFILE

PRIORITY

This application is a Continuation of U.S. patent application Ser. No. 11/782,912, filed Jul. 25, 2007; now U.S. Pat. No. 7,959,284, which claims priority to U.S. provisional patent applications Nos. 60/820,340, filed Jul. 25, 2006, and 60/820,483, filed Jul. 26, 2006, which are incorporated by reference.

BACKGROUND

Traditional methods of making an optical surface profile involve grinding and polishing. Automated polishing typically uses a turn table, which is ideal for spherically symmetric surfaces, but it can destroy small wavefront profiles.

Wavefront profiles typically comprise peaks and valleys of the order of microns as measured in optical path difference (OPD). Even if the profile can be accurately produced on an optical surface, a conventional polishing process removes up to a couple of microns of material and it will tend to erase most if not all the intended profile distribution as if they are part of the irregularity to be polished off.

With the advent of a diamond turning CNC machine, 4 and 5 axis free-form precision cutting became commercially available. Multi-axis polishing has also been developed. A disadvantage of ultra high precision CNC is its high cost.

It is desirable to provide a method of making high precision optical surfaces, including those with a high order wavefront profile, at a cost effective level.

SUMMARY OF INVENTION

A method of generating a high precision optical surface profile includes obtaining a an optical path difference (OPD) profile for correcting certain wavefront aberrations, e.g., of an eye or another optical system including a lens and electronic photodetector or human eye, and/or a light source such as a laser or ambient light. A substrate material has a known index of refraction, Ns, while a cover material has an index Nc that is more closely matched to the index Ns of the substrate material than the index of refraction of air, Nair to Ns. An exaggerated surface profile is cut that is proportionally expanded from the OPD profile by a factor: (Ns−Nair) divided by the absolute value of (Ns−Nc). The cut surface profile is covered with the cover material.

The method may include forming an optical window at the exterior surface of the cover material. The window surface may have a concave, convex, aspheric, and/or astigmatic curvature, or otherwise.

The cover material may include liquid. The cover material may be changeable from liquid form to solid form by thermal curing or a photo-polymerization curing method, or both. The method may include changing the cover material from liquid form to solid form by thermal curing and/or by a photo-polymerization curing method.

The cover material may be derived from a chemically altered structure of the substrate material. The method may include deriving the cover material from a chemically-altered structure of the substrate material.

An optical element which is specified with a high precision wavefront profile or a OPD map, may be manufactured by any of the recited methods.

An optic is also provided with an OPD profile for correcting certain wavefront aberrations. A substrate material has a known index of refraction Ns. A cover material over the substrate material has an index Nc more closely matched to the index Ns of the substrate material than the index of air Nair to Ns. A cut surface of the substrate has a profile proportionally expanded from the OPD profile by a factor (Ns−Nair) divided by the value of (Ns−Nc).

An optical window may cover the cover material, which may have concave, convex, aspheric, and/or astigmatic curvature, or otherwise. The cover material may include liquid. The cover material may be changeable from liquid form to solid form by thermal curing and/or a photo-polymerization curing method. The cover material may be derived from a chemically altered structure of the substrate material.

In general with regard to the methods and optics described herein, only the OPD value of the surface profile of an optical element is expanded by the "expansion factor" along the direction of the light ray. The dimension relating to the dimension of the surface area X and Y are not expanded.

DETAILED DESCRIPTION OF THE EMBODIMENTS

Techniques for generating a high precision optical profile without using expensive ultra high precision CNC machines are described below.

The substrate material of the optic can be any selected from commercially available optical plastics such as CR-39, polycarbonates, or other high index (1.6 or higher) plastics, or traditional glass, BK7, crown glass, fused silica, and the like.

Once the substrate material is selected, one then selects a "matching" material that has an index of refraction very closely matched with that of the selected substrate material. For example, the substrate material may be an optical grade plastic lens having an index of refraction of 1.513. One can select a "matched" material with an index of 1.538, providing an index difference of 0.025.

Figure 1:
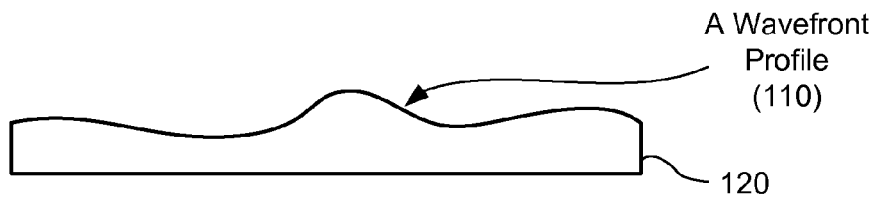
FIG. 1 schematically illustrates a substrate having a high precision optical surface profile.
Figure 2:
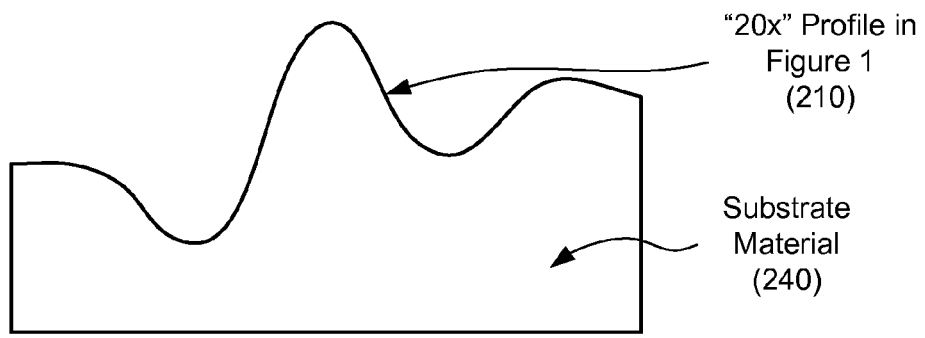
FIG. 2 schematically illustrates a substrate having an exaggerated or expanded version of the surface profile of FIG. 1.

A wavefront profile may be generated that has peaks and valleys, and for example, the peak to valley (P-V) amplitude may be required to be exactly 0.55 microns. A cross sectional view of a corresponding two-dimensional profile 110 formed in substrate 120 is illustrated in FIG. 1. Instead of using an ultra high precision CNC machine, one may use a reduced precision CNC machine with a depth cutting accuracy of 0.5 microns in accordance with an embodiment. Instead of cutting an actual profile with P-V of 0.55 microns, the substrate 240 of FIG. 2 is cut with a similar profile 210, except that P-V is now 11 microns, which is 20 times the amplitude of the P-V of the original profile formed in substrate 2 of FIG. 1. The cut profile of FIG. 2 is expanded or exaggerated by a factor of 20 compared with the high precision profile of FIG. 1.

Figure 3:
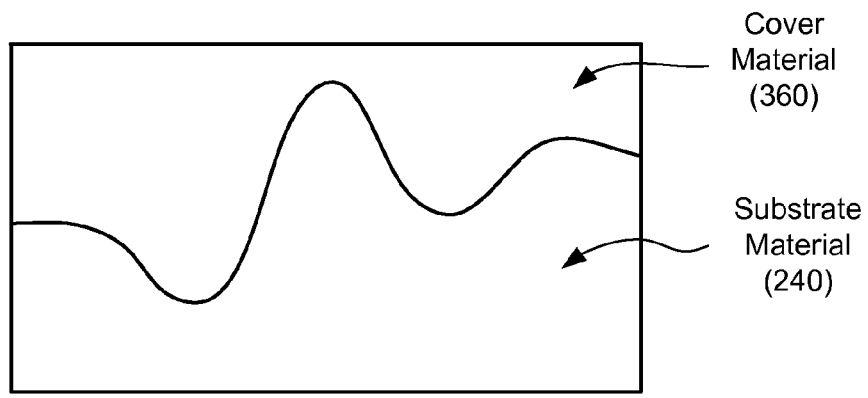
FIG. 3 schematically illustrates the substrate of FIG. 2 covered with a cover material.
Figure 4:
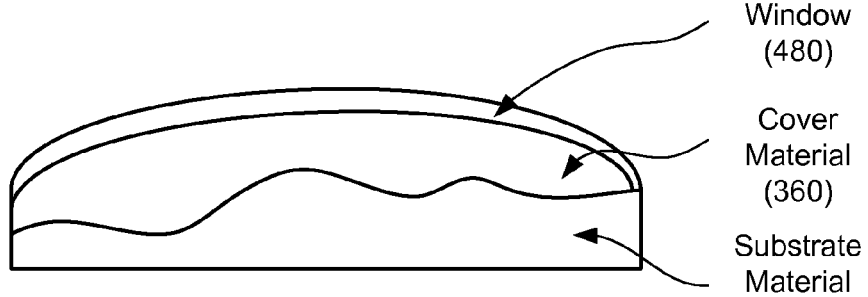
FIG. 4 schematically illustrates an optical window over the cover material of FIG. 3.

A thin layer of "matched" cover material 360 is applied over the cut profile 210, shielding it from air as illustrated at FIG. 3. An optical window 480 can be applied over the matched material 360, particularly if the material 360 is to remain in liquid form, as illustrated at FIG. 4. The window may have a front surface that is flat, concave, convex, aspheric, astigmatic and/or other selected surface profile to generate desirable optical refraction effects when light rays pass through it.

It is recognized by the present inventor that the index difference between the substrate and the "matched" cover is −0.025 in the example, which is about 20 times smaller than the difference between that of the substrate and air, which is 0.513 in this example. Advantageously, the optical path differences across the two profiles are the same: between the case that a profile with P-V of 0.55 microns from substrate to air and the case that a profile with P-V of 11 microns covered with a "matched" material to lower the index of refraction difference.

By using this index "matching" method, one may use a lower precision CNC or other surface generating methods to first generate a much less precision demanding surface and in combination of a index "matching" layer of material over the generated surface, to accomplish the generation of an ultra high precision OPD profile which would conventionally involve a higher precision and more costly CNC machine. The effect of polishing no longer has the damaging effect of erasing a substantial portion of the OPD profile, but rather, only a small fraction of the profile accuracy may be affected in the case with the expanded cut profile.

The index values used in the examples above are for illustration, and other index values can be used. The lowering of index transition from substrate to air versus substrate to "matched" material by a factor of 20 is also intended as an example, and not to be construed as a limiting factor. For the cases that involve a profile with very small OPDs, a larger expansion ratio is more beneficial, and vice versa, namely for the larger OPD wavefront profiles, a smaller magnificent factor and therefore a less "matched" index materials may be used.

The present method does not exclude the use of a higher precision CNC surface generating machines. Indeed, one may take advantage of the higher precision profile as the starting point, and generate an even higher precision profile, thereby extending the precision level of a ultra high precision CNC unit by a factor 10 or more as described.

The cover material has been described above as having an index of refraction lower than that of the substrate. One may also choose the cover index to be higher than that of the substrate in the polymer compounds. In that event, the expanded cut profile will be the inverse of the original/starting OPD profile. For example, if Nc is greater than Ns, one would first invert the OPD profile in FIG. 1, the hills become valleys and vise versa. Then the cut profile is expanded based on the inverted profile. However, the resultant effects of achieving a high precision OPD profile, and the associated benefits are substantially the same. Therefore the equation of the expansion factor for an OPD profile, (Cut surface profile)=(original surface profile)×($N_s$−$N_{air}$)/($N_s$−$N_c$), or OPD(cut)=OPD(original)×($N_s$−$N_{air}$)/($N_s$−$N_c$), remains valid for both cases when Ns>Nc, and Nc>Ns. The negative sign in the denominator in the case of Nc>Ns, will essentially invert the OPD profile (a negative OPD), where a negative expansion factor is applied to the original OPD profile to form an inverted profile.

Figure 5:
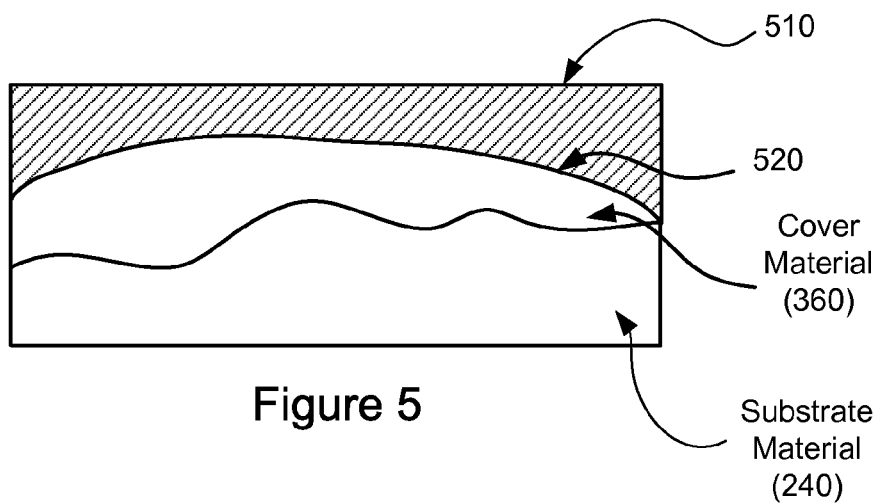
FIG. 5 schematically illustrates another embodiment including an optical window formed by an optical mold.

The "matched" material can be in liquid form. The material in liquid form can be hardened by thermal curing or methods such as photo-polymerization. In another embodiment as shown in FIG. 5, the optical window at the cover material may be formed by an optical mold 510. One surface of the mold is polished to be optically smooth, and this surface is placed in contact with the liquid of the cover material, such that a window surface is controllably formed in accordance with the shaped surface 520 of the mold. The liquid is then thermally cured, or by photo-polymerization methods and mold is then removed.

Figure 6:
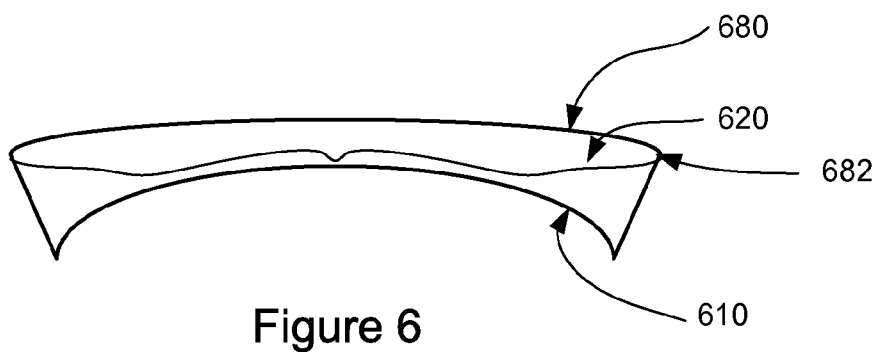
FIG. 6 schematically illustrates an embodiment including an exemplary lens having negative diopter power.

In another embodiment as shown in FIG. 6, the back surface 610 of the substrate material, the surface that is not cut to generate the OPD profile, may be cut to correct refractive errors of the eye. As illustrated in FIG. 6, the back surface 610 may be cut and polished to generate diopter power correcting single vision errors including the sphere, cylinder, and axis errors or correcting progressive addition lens (PAL) errors. In FIG. 6, the exemplar lens exhibits negative diopter power, having thicker material at the periphery than that at the center. The front surface 680 may be formed by a thin window layer 682, as illustrated in 480 in FIG. 4. The top layer 682 may be formed from the cover material as illustrated in 520 in FIG. 5 using a molding method. The cut wavefront profile surface between the substrate material and the cover material is shown here as 620. Note that the wavefront profile is formed along a curved surface to optimize the lens "thinness". The optical element so produced may be used as an ophthalmic lens in eyeglasses that incorporates wavefront profile that corrects the higher order aberrations of the eye. Methods of measuring and compensating higher order aberrations of the eye have been described in U.S. Pat. Nos. 7,188,950, 6,836, 371, and 7,217,375, all of which are incorporated herein by reference.

In generating a cut surface using a CNC machine, the cut profile is typically specified by a file including a raster of point locations. Each point location contains the axial location of the cutter tip, or the cutting height. It is preferable to provide the derivative values of the cut curve to further specify a speed of change of a cutter's location. Both the point file and the derivative file are stored in computer readable media. The cutting program of the CNC machine reads the cut profile data from the storage location and controls the movement, speed and the location of the cutting tip. One or more storage media may be provided with a computer-component of a CNC machine for this purpose. In addition, program code may also be provided for programming the same processor or a different processor than that which controlled the cutting of the substrate for controlling a method of covering the cut surface profile with the cover material. For example, after the CNC cutting process, the cut substrate may be moved, shipped or otherwise transported to another processor-controlled machine for covering the cut substrate according to program code provided at that machine.

Index variation can be controlled in polymer compounds such as those used in optical plastic lenses by modifying in a part of its structure. For example, one may modify the bond types, bond angles, or the chain lengths, or by attaching various ions or atoms, or adding or subtracting polymer units or molecules to selected structures. These are just examples wherein an index of refraction of a material can be controllably altered.

One can generate the cover material from the substrate material using one or more of the mentioned methods or other known index changing method. That way, the cover and the substrate would be chemically and structurally matched and less susceptible to problems related with bonding the substrate and the cover materials together.

In the above description, the word "matched" merely indicates a "closely matched" condition, or having a small refractive index difference, and is not meant to require the indices of the materials to be "identical" or exactly the same. The indices may be one or two or three tenths different or more, or may be a hundredth, two-hundredth or three hundredth or more.

The terms wavefront profile, OPD map, and surface profile are used to describe a two dimensional X-Y distribution of optical path difference OPD, either at the surface or through the entire optical element. The OPD is analogous to a geographic contour map except the hills and valleys (Z direction) are now in the units of microns or other convenient units describing the OPD.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, as well as U.S. patent applications Nos. 60/826,043, 60/820,340, 60/804,919, 11/746,051, 11,764,160 and 11/675,079, and U.S. Pat. Nos. 7,220,255, 7,217,375, 6,761,454 and 6,836,371, also by Dr. Shui Lai, are all hereby incorporated by reference into the detailed description of the preferred embodiments as disclosing alternative embodiments and components.

What is claimed is:

1. An optical element having a wavefront profile for correcting wavefront aberrations, comprising:
   (a) a substrate comprising a material having an index of refraction Ns;
   (b) a cut surface of the substrate cut to a profile that mimics the wavefront profile wherein said surface cut to said profile is expanded from the wavefront profile by a factor of (Ns−Nair) divided by the absolute value of (Ns−Nc), where Nair is the index of refraction of air; and
   (c) a cover comprising a material having an index of refraction Nc covering the cut surface of the substrate.

2. The optical element of claim 1, wherein Ns is greater in value than Nc, and the profile of the cut surface is expanded directly proportionally to the wavefront profile, and wherein a shape of a peak in the wavefront profile corresponds to a peak in the profile of the cut surface profile exaggerated by the expansion factor.

3. The optical element of claim 1, wherein Ns is smaller in value than Nc, and the profile of the cut surface is expanded inversely proportionally to the wavefront profile, and wherein a shape of a peak in the wavefront profile corresponds to a shape of a valley in the profile of the cut surface exaggerated by the expansion factor.

4. The optical element of claim 1, further comprising a window covering the material of the cover.

5. The optical element of claim 1, further comprising a window formed by the material of the cover.

6. The optical element of claim 1, further comprising a window that has a surface including a flat, or concave, or convex, or aspheric contour, or an astigmatic curvature, or combinations thereof.

7. The optical element of claim 1, wherein the cover material comprises a material derived from a chemically altered structure of the material of the substrate.

8. The optical element of claim 7, wherein the chemically altered structure is provided by modifying one or more of the bonds, including shortening a bond.

9. An optical element having a wavefront profile, configured to form an ophthalmic lens for correcting refractive errors of the eye, comprising:
   (a) a substrate comprising a material having an refractive index Ns, and having a front and a back surface;
   (b) a cover comprising cover material having a refractive index Nc
   (c) a cut profile on the front surface of the substrate material, wherein the cut profile corresponds to the wavefront profile expanded by a factor of (Ns−1) divided by the absolute value of (Ns−Nc); and
   (d) a window covering the cover material; and
   (e) wherein refractive power of the ophthalmic lens is provided by a shape profile at a surface of the window or by a shape profile at the back surface of the substrate, or both.

10. The optical element of claim 9, wherein the window comprises cover material.

11. The optical element of claim 9, wherein a surface of the window has a flat, or concave, or convex, or aspheric curvature, or an astigmatic curvature, or combinations thereof.

12. The optical element of claim 11, wherein the surface of the window has been generated by cutting.

13. The optical element of claim 12, wherein the cutting has been generated by a raster of point locations, each point location containing an axial location for a cutter tip.

14. The optical element of claim 12, wherein the cutting has been generated using derivative values of a cutting curve.

15. The optical element of claim 9, wherein the back surface of the substrate has a concave curvature.

16. The optical element of claim 15, wherein the back surface of the substrate has been generated by cutting.

17. The optical element of claim 16, wherein the cutting has been generated by a raster of point location, each point location contains the axial location of the cutter tip.

18. The optical element of claim 16, wherein the cutting has been generated using derivative values of the cutting curve.

19. The optical element of claim 9, wherein the cover comprises liquid.

20. The optical element of claim 19, wherein the liquid comprises a material that is hardened by a process including thermal curing, or photo-polymerization, or a combination thereof.

21. The optical element of claim 20, wherein the process further includes contacting a mold with the window or the cover, and applying a material hardening process to fix the shape of the window or the cover.

22. The optical element of claim 7, wherein the chemically altered structure is provided by modifying one or more of the bonds, including lengthening a bond.

23. The optical element of claim 7, wherein the chemically altered structure is provided by modifying one or more of the bonds, including changing an angle of a bond.

24. The optical element of claim 7, wherein the chemically altered structure is provided by adding or subtracting one or more molecules.

25. The optical element of claim 7, wherein the chemically altered structure is provided by adding or subtracting one or more ions or atoms.

26. The optical element of claim 7, wherein the chemically altered structure is provided by adding or subtracting one or more polymer units.

27. The optical element of claim 12, wherein the cutting has been generated by a raster of point locations, each point location containing an axial location for a cutter height.

28. The optical element of claim 16, wherein the cutting has been generated by a raster of point location, each point location contains the axial location of a cutter height.

29. The optical element of claim 9, wherein the back surface of the substrate has a convex curvature.

30. The optical element of claim 9, wherein the back surface of the substrate has a progressive addition lens profile curvature.

31. The optical element of claim 9, wherein both the cover and the window comprise liquid.

* * * * *